(12) United States Patent
Nikopour

(10) Patent No.: US 11,082,273 B2
(45) Date of Patent: Aug. 3, 2021

(54) APPARATUSES FOR NEXT GENERATION BLOCK-WISE SINGLE CARRIER WAVEFORMS

(71) Applicant: INTEL CORPORATION, Santa Clara, CA (US)

(72) Inventor: Hosein Nikopour, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 16/074,358

(22) PCT Filed: Apr. 11, 2016

(86) PCT No.: PCT/US2016/026883
§ 371 (c)(1),
(2) Date: Jul. 31, 2018

(87) PCT Pub. No.: WO2017/180088
PCT Pub. Date: Oct. 19, 2017

(65) Prior Publication Data
US 2020/0267037 A1 Aug. 20, 2020

(51) Int. Cl.
*H04L 27/26* (2006.01)
*H04L 25/03* (2006.01)

(52) U.S. Cl.
CPC ...... *H04L 27/2607* (2013.01); *H04L 25/0314* (2013.01); *H04L 25/03159* (2013.01);
(Continued)

(58) Field of Classification Search
CPC ............. H04L 27/2636; H04L 27/2607; H04L 25/0314; H04L 5/0007; H04L 27/01;
(Continued)

(56) References Cited

U.S. PATENT DOCUMENTS 8,238,318 B1 * 8/2012 Negus ................... H04W 84/12
370/338
9,167,579 B2 * 10/2015 Fettweis ............. H04W 72/044
(Continued)

OTHER PUBLICATIONS

Chen, et al., "Properties and Power Spectral Densities of CP Based OQAM-OFDM Systems", IEEE Transactions on Signal Processing, vol. 63, No. 14, Jul. 15, 2015, 15 pages.
(Continued)

*Primary Examiner* — Khanh C Tran
(74) *Attorney, Agent, or Firm* — Alliance IP, LLC

(57) ABSTRACT

Disclosed are apparatuses for a communication device. An apparatus for a communication device includes control circuitry configured to use circular convolution for pulse shape filtering of a block of data symbols of a single carrier waveform to generate a block-wise single carrier (BWSC) symbol. The apparatus is also configured to insert one of a data-based cyclic prefix or a data-based cyclic postfix into the BWSC symbol one of before the pulse shape filtering or after the pulse shape filtering. An apparatus for a communication device includes control circuitry configured to remove one or more of a cyclic prefix or a cyclic postfix from a received BWSC symbol, and use circular convolution to demodulate the received BWSC symbol.

23 Claims, 7 Drawing Sheets

(52) U.S. Cl.
CPC ...... *H04L 25/03834* (2013.01); *H04L 27/265* (2013.01); *H04L 27/2636* (2013.01); *H04L 2025/03426* (2013.01)

(58) Field of Classification Search
CPC ..... H04L 1/0003; H04L 1/0009; H04L 1/004; H04L 25/03019; H04L 25/03828; H04L 5/0048; H04L 25/03159; H04L 27/265; H04L 5/006; H04L 5/143; H04L 27/3411; H04L 25/03834; H04L 27/3444; H04B 7/0408; H04B 7/088; H04B 10/50
See application file for complete search history.

(56) References Cited

U.S. PATENT DOCUMENTS

| | | | |
|---|---|---|---|
| 2013/0034054 A1 | 2/2013 | Huan | |
| 2013/0044028 A1* | 2/2013 | Lea | H04L 5/0007 342/359 |
| 2013/0064282 A1 | 3/2013 | Roh | |
| 2014/0233437 A1* | 8/2014 | Abdoli | H04J 11/00 370/280 |
| 2015/0172010 A1* | 6/2015 | Gaspar | H04L 27/2605 375/295 |
| 2016/0112238 A1* | 4/2016 | Ling | H04B 10/612 375/261 |
| 2016/0211999 A1* | 7/2016 | Wild | H04L 25/03891 |
| 2016/0330265 A1* | 11/2016 | Abdoli | H04L 5/0021 |
| 2017/0310509 A1* | 10/2017 | Qian | H04L 27/2691 |
| 2017/0331663 A1* | 11/2017 | Moradi | H04L 27/3494 |
| 2019/0052486 A1* | 2/2019 | Kuchi | H04L 27/2614 |
| 2020/0052947 A1* | 2/2020 | Sahin | H04W 72/0453 |

OTHER PUBLICATIONS

Frank, et al., "A Survey on the Envelope Fluctuations of DFT Precoded OFDMA Signals", IEEE International Conference on Communications, Beijing, China, May 2008, 6 pages.

PCT/US2016/026883, International Search Report and Written Opinion, dated Dec. 9, 2016, 15 pages.

Taiwan Patent Office; Search Report and Office Action issued in TW Application No. 106108057, dated Jun. 29, 2020; 18 pages including English translation.

Mark Cudak, Tom Kovarik, Timothy A. Thomas, Amitava Ghosh, Yoshihisa Kishiyama, Takehiro Nakamura, "Experimental mmWave 5G Cellular System," Globecom 2014 Workshop—Mobile Communications in Higher Frequency Bands.

Stephen G. Larew, Timothy A. Thomas, Mark Cudak, Amitava Ghosh, "Air Interface Design and Ray Tracing Study for 5G Millimeter Wave Communications," Nokia Solutions and Networks, Globecom 2013 Workshop—Emerging Technologies for LTEAdvanced and Beyond-4G.

* cited by examiner

US 11,082,273 B2

APPARATUSES FOR NEXT GENERATION BLOCK-WISE SINGLE CARRIER WAVEFORMS

RELATED APPLICATIONS

This application is a national stage filing under 35 U.S.C. § 371 of International Patent Application No. PCT/US2016/026883, filed Apr. 11, 2016, which is hereby incorporated by reference herein in its entirety.

TECHNICAL FIELD

This disclosure relates generally to the field of wireless communications, and more specifically to user equipment and base stations configured to use data-based cyclic prefix/postfix and circular convolution to modulate and/or demodulate block-wise single carrier waveforms.

BACKGROUND

In recent years, demand for access to fast mobile wireless data for mobile electronic devices has fueled the development of the 3rd Generation Partnership Project (3GPP) long term evolution (LTE) communication system (hereinafter "LTE system"). End users access the LTE system using mobile electronic devices (known as "user equipment," or equivalently "UE") including appropriate electronics and software modules to communicate according to standards set forth by 3GPP. Discussions and research are currently directed toward a next generation communication protocol (e.g., 5G).

DETAILED DESCRIPTION OF PREFERRED EMBODIMENTS

Figure 1:
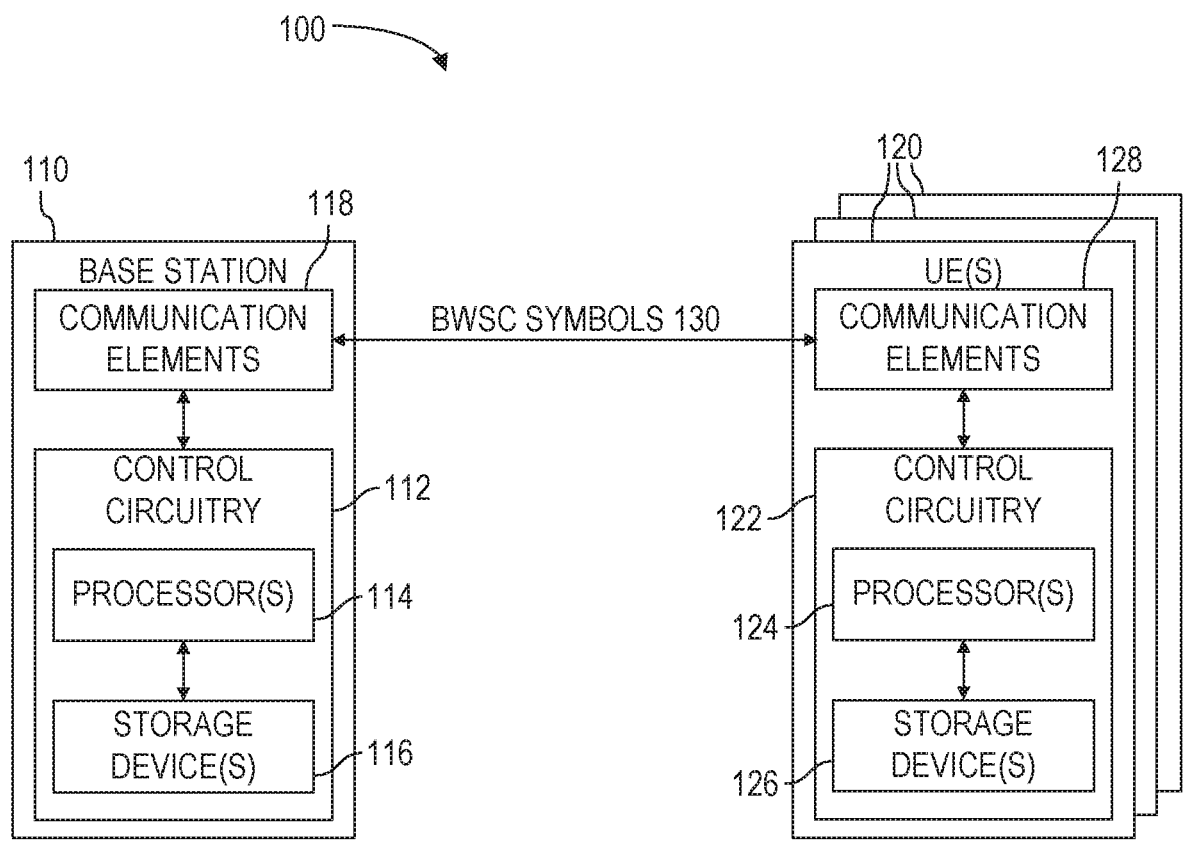
FIG. 1 is a simplified block diagram of a wireless communication system according to some embodiments.

In the following detailed description, reference is made to the accompanying drawings, which form a part hereof, and in which are shown by way of illustration specific embodiments in which the present disclosure may be practiced. These embodiments are described in sufficient detail to enable those of ordinary skill in the art to practice the disclosure made herein. It should be understood, however, that the detailed description and the specific examples, while indicating examples of embodiments of the disclosure, are given by way of illustration only, and not by way of limitation. From the disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths, and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, a signaling diagram, or a block diagram. Although a flowchart or signaling diagram may describe operational acts as a sequential process, many of these acts can be performed in another sequence, in parallel, or substantially concurrently. In addition, the order of the acts may be rearranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

Low peak to average power ratio (PAPR) is an advantage of using a single carrier waveform, making it a strong candidate for 5G mmWave wireless communications. Complexity of channel equalization, however, is a practical challenge, especially for broadband communications (e.g., mmWave with more than 1 GHz bandwidth). Frequency domain equalization is an approach to reduce complexity of reception with a single carrier waveform, but involves manipulation of a block of data symbols (QAM symbols) before transmission to enable discrete Fourier transform (DFT) processing and frequency domain equalization at a receiver. Null cyclic prefix (NCP) addresses this issue, but reduces the efficiency of the system due to null padding and bandwidth expansion as the result of single carrier pulse shape filtering.

The disclosure provides a solution to enable frequency domain equalization for a single carrier waveform while maintaining relatively low overhead of modulation to achieve good system efficiency Embodiments disclosed herein relate to enabling frequency domain equalization for single carrier modulation. Circular convolution and data-based cyclic prefix/postfix (CP) insertion are adopted for block-wise single carrier modulation and demodulation. The technique (data CP or "DCP") removes the overhead of a pulse shaping filter. It leads to better system efficiency, lower side lobes of the spectrum, and consistent power across a signal transmission time interval. In addition, as opposed to the NCP approach with on-off behavior of the signal, the structure of each block of DCP symbol allows the receiver to reuse orthogonal frequency domain multiplexing (OFDM) or orthogonal frequency domain multiple access (OFDMA) techniques for time, frequency synchronization and other processing techniques, which use cyclic prefix as known for OFDM or OFDMA.

In some embodiments, disclosed is an apparatus for a communication device. The apparatus includes control circuitry configured to use circular convolution for pulse shape filtering of a block of data symbols of a single carrier waveform to generate a block-wise single carrier (BWSC) symbol, and to insert one of a data-based cyclic prefix or a data-based cyclic postfix into the BWSC symbol one of before the pulse shape filtering or after the pulse shape filtering.

In some embodiments, disclosed is an apparatus for a communication device. The apparatus includes one or more processors and one or more computer-readable storage media operably coupled to the one or more processors and including computer-readable instructions stored thereon, the computer-readable instructions configured to instruct the one or more processors to remove one or more of a cyclic prefix or a cyclic postfix from a received block-wise single carrier (BWSC) symbol, and to add a periodic extension comprising a prefix periodic extension, a postfix periodic extension, or a combination thereof to the BWSC symbol to generate an extended BWSC symbol. The computer-readable instructions are also configured to instruct the one or more processors to filter the extended BWSC symbol to produce a filtered BWSC symbol, downsample the filtered BWSC symbol to obtain a block of periodically extended symbols, and remove redundancies from the block of periodically extended symbols to obtain a block of data symbols.

In some embodiments, disclosed is an apparatus for a communication device. The apparatus includes control circuitry configured to remove at least one of a cyclic prefix or a cyclic postfix from a received block-wise single carrier (BWSC) symbol, and filter the received BWSC symbol with a match filter initialized to an initial state to circularly convolve the BWSC symbol to generate a filtered BWSC symbol, the match filter matching a filter used by a far-end communication device to generate the received BWSC symbol.

FIG. 1 is a simplified block diagram of a wireless communication system 100 according to some embodiments. The wireless communication system 100 includes a base station 110 and User Equipment (UEs) 120 (e.g., cellular communications enabled electronic devices). The base station 110 includes communication elements 118 (e.g., an antenna, transmission circuitry, receiving circuitry, etc.) configured to engage in wireless communication with communication elements 128 of the UEs 120.

The base station 110 and the UEs 120 include control circuitry 112, 122, respectively, configured to perform functions of embodiments described herein. By way of non-limiting example, at least one of the control circuitry 112, 122 is configured to use circular convolution for pulse shape filtering of a block of data symbols of a single carrier waveform to generate a block-wise single carrier (BWSC) symbol, and to insert one of a data-based cyclic prefix or a data-based cyclic postfix into the BWSC symbol. Also by way of non-limiting example, at least one of the control circuitry 112, 122 is configured to process BWSC symbols including a data-based cyclic prefix or a data-based cyclic postfix using circular convolution. By way of non-limiting example, these functions may be performed using application circuitry 802 (FIG. 8), baseband circuitry 804 (FIG. 8), hardware resources 700 (FIG. 7), other circuitry, or combinations thereof. For the base station 110, the communication elements 118 and the control circuitry 112 can be included in a single device or in a plurality of different devices (e.g., cloud-RAN (C-RAN) implementations).

The control circuitry 112, 122 includes one or more processors 114, 124 (sometimes referred to herein as "processor" 114, 124) operably coupled to one or more data storage devices 116, 126 (sometimes referred to herein as "storage" 116, 126). The processor 114, 124 includes any of a central processing unit (CPU), a microcontroller, a programmable logic controller (PLC), a programmable device, other processing devices, or combinations thereof. In some embodiments the processor 114, 124 also includes one or more hardware elements (not shown) configured to perform at least a portion of the functions the control circuitry 112, 122 is configured to perform. By way of non-limiting example, the processor 114, 124 may include an application specific integrated circuit, a system on chip (SOC), an array of logic gates, an array of programmable logic gates (e.g., a field programmable gate array (FPGA)), other hardware elements, or combinations thereof. The processor 114, 124 is configured to execute computer-readable instructions stored on the storage 116, 126.

The storage 116, 126 may include non-transitory computer-readable storage media. By way of non-limiting example, the storage 116, 126 includes volatile storage (e.g., random access memory (RAM)), non-volatile storage (e.g., read only memory (ROM)), or combinations thereof. In some embodiments, the processor 114, 124 may be configured to transfer computer-readable instructions stored in non-volatile storage of the storage 116, 126 to volatile storage of the storage 116, 126 for execution. By way of non-limiting example, the storage 116, 126 may include dynamic RAM (DRAM), electrically programmable read-only memory (EPROM), a hard drive, a solid state drive, a Flash drive, a magnetic disc, removable media (e.g., memory cards, thumb drives, optical discs, etc.), or other storage devices.

The computer-readable instructions stored on the storage 116, 126 are configured to instruct the processor 114, 124 to perform at least a portion of the operations the control circuitry 112, 122 is configured to perform. By way of non-limiting example, the computer-readable instructions may be configured to instruct the processor 114, 124 to perform at least a portion of processing of a BWSC modulator 200, 400 (discussed below with reference to FIGS. 2A-2C and FIG. 4). Also by way of non-limiting example, the computer-readable instructions may be configured to instruct the processor 114, 124 to perform at least a portion of processing of a BWSC demodulator 300, 500 (as discussed below with reference to FIGS. 3A-3D and FIG. 5). Further description of examples of the control circuitry 112, 122 is provided below with reference to FIGS. 7 and 8.

Single-carrier (SC) waveform with relatively low PAPR may be suitable for mmWave transmission with tight radio frequency (RF) requirements. Low PAPR is useful for handling nonlinear behavior of power amplifiers (PAs) and other nonlinear circuitries in the transmission chain. For example, a block of symbols (e.g., QAM symbols) may form an input to a BWSC modulator, and an output of the BWSC modulator may be a block of discrete samples (e.g., that may be provided to a digital to analog converter (DAC) or other processing circuitry). The BWSC modulator may include a pulse shaping filter. In order to enable baseband processing of BWSC, the pulse shaping filter may be implemented in discrete time.

An analog root raised cosine (RRC) filter is an example of a pulse shaping filter with relatively good frequency domain localization (e.g., parameters of the RRC filter include a roll-off factor of an RRC function of the RRC filter). An analog RRC shaping filter in combination with RRC match filter at the receiver meet the Nyquist criterion to avoid inter-symbol-interference (ISI) in an additive white Gaussian noise (AWGN) or flat fading channel. To enable baseband BWSC processing, the analog filter is discretized to be implementable in a discrete time domain with a finite-impulse-response (FIR) filter. The length of the truncated filter may be U(2L+1) where L is a truncation length parameter and U is the upsampling rate above Nyquist rate, which is the clock rate of input samples of the BWSC modulator. Once the analog RRC is sampled and truncated to a limited length, however, the ideal orthogonality and Nyquist ISI criterion are lost. The values of L and depend quite rigidly on the ISI tolerance of the system, often leading to a relatively high truncation length L, which may result in relatively high overhead for NCP.

Instead of applying symbols to a pulse shaping filter using a linear convolution, BWSC modulation can be implemented using circular convolution. For example, a BWSC modulator 200, 400 (FIG. 2, 4) may be designed to take advantage of circular convolution for pulse shaping at the transmitter (e.g., the base station 110, the UEs 120, or a combination thereof). Circular match filtering may be used at the receiver (e.g., the base station 110, the UEs 120, or a combination thereof) to process a BWSC symbol 130 produced by the BWSC modulator 200, 400. The BWSC modulator 200, 400 may be designed to achieve large L that should not cause any extra overhead to the system and maintains high system efficiency. Larger truncation length of the filter (larger L) also reduces the side lobes of a spectrum and maintains a low ISI level (e.g., very close to the original analog RRC filter).

Figure 2A:
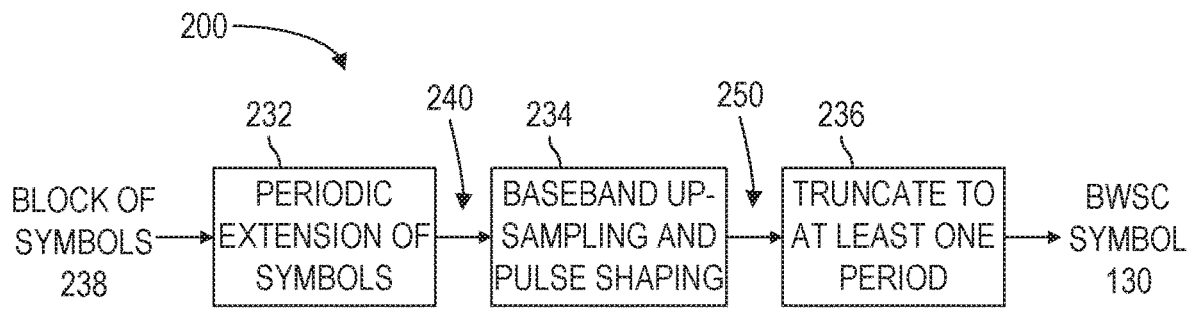
FIG. 2A is a simplified signal flow diagram of an example block-wise single carrier (BWSC) modulator, according to some embodiments.
Figure 2B:
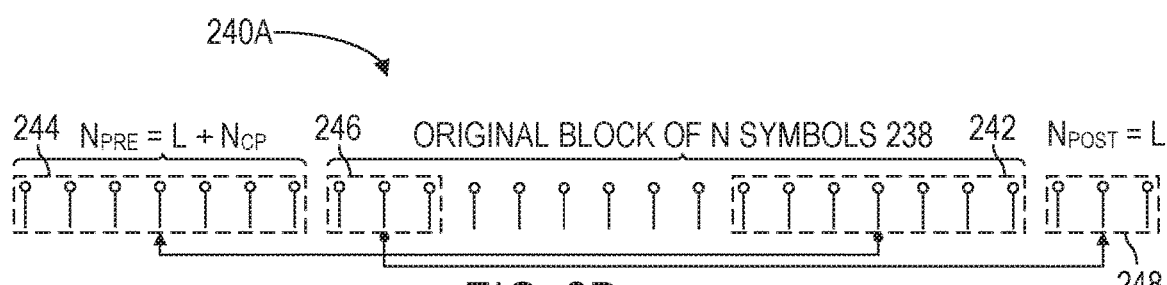
FIG. 2B is a simplified view illustrating example extended symbols that periodic extension of symbols of FIG. 2A may produce.
Figure 2C:
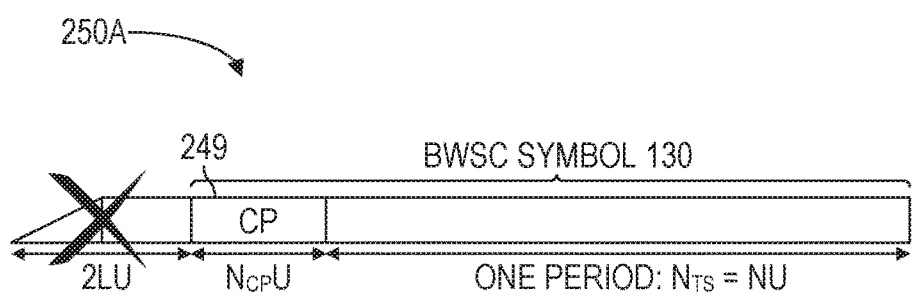
FIG. 2C illustrates truncation of example filtered symbols to produce an example BWSC symbol.

FIGS. 2A-2C illustrate functions of one example of a BWSC modulator 200 (FIG. 2A) for using circular convolution and data-based cyclic prefix/postfix ("data-CP BWSC").

FIG. 2A is a simplified signal flow diagram of an example BWSC modulator 200, according to some embodiments. The BWSC modulator 200 includes a periodic extension of symbols 232 configured to extend a block of N symbols 238 (e.g., quadrature amplitude modulated (QAM) symbols)) periodically with prefix and/or postfix insertions to produce a block of periodically extended symbols 240 (sometimes referred to herein as "extended symbols" 240).

FIG. 2B is a simplified view illustrating example extended symbols 240A that the periodic extension of symbols 232 of FIG. 2A may produce. Referring to FIGS. 2A and 2B together, for example, the last $N_{PRE}=L+N_{CP}$ symbols 242 of the original block of N symbols 238 may be replicated and added as a prefix 244 to the original block of N symbols 238, where $N_{CP}$ is a number of symbols for a cyclic prefix, and L is a number of symbols of the prefix in addition to the cyclic prefix. Also, the first L symbols 246 of the original block of symbols 238 may be replicated and added as a postfix 248 to the original block of N symbols 238. With the prefix 244 and the postfix 248 added to the original block of N symbols 238, the example extended symbols 240A may be formed. In this example, the L symbols of the prefix 244 and the postfix 248 enable circular convolution (e.g., to be performed by baseband upsampling and pulse shaping 234), and the extra $N_{CP}$ prefix symbols are added to deal with delay spread of a fading channel, and maintain circular convolution and fast Fourier transform (FFT) processing capability at a far-end receiver.

The example extended symbols 240A are illustrative only, and the extended symbols 240 may take different forms than that of the example extended symbols 240A. For example, instead of the cyclic prefix in the prefix 244, the postfix 248 may include a cyclic postfix (e.g., the postfix 248 may be of length $L+N_{CP}$). As another example, the extended symbols 240 may only include one of the prefix 244 or the postfix 248 (e.g., of length $2L+N_{CP}$). As a further example, the prefix 244 and the postfix 248, less a cyclic prefix/postfix, may be of different lengths (e.g., $N_{PRE}-N_{CP} \neq N_{POST}$). Regardless of the form of extension, the extended symbols 240 include the original block of N symbols 238, and a periodic extension thereof in addition to the original block of N symbols 238. Also, in some embodiments, the upsampling may be performed before the periodic extension 232.

The BWSC modulator 200 also includes a baseband upsampling and pulse shaping 234 configured to upsample the extended symbols 240 and apply the upsampled extended symbols to a filter (e.g., a pulse shaping filter such as an RRC filter) to produce a block of filtered symbols 250 (sometimes referred to herein as "filtered symbols" 250). The baseband upsampling and pulse shaping 234 may, for example, upsample the extended symbols 240 by a factor of U (e.g., inserting a number U−1 of zeros into the extended symbols 240 for every symbol of the extended symbols 240) to produce a block of upsampled symbols. The upsampled symbols are periodic, and extend for more than one period, enabling circular convolution by the filter.

Since the upsampled symbols are periodic, applying the upsampled symbols to the filter produces a periodic output of the filter. Accordingly, the filtered symbols 250 will also be periodic. A single period of the filtered symbols 250, however, would be enough to demodulate and extract the original block of symbols 238 at a receiver. Also, one purpose of the periodic extension of symbols 232 was to enable the circular convolution by the filter at the baseband upsampling and pulse shaping 234. Accordingly, the BWSC modulator 200 includes a functional block 236 configured to truncate the filtered symbols 250 to remove some redundancy to produce a BWSC symbol 130. As a result, extra overhead processing by the filter is avoided in contrast to a null cyclic prefix scheme.

FIG. 2C illustrates truncation of an example filtered symbol 250A to produce an example BWSC symbol 130A. Referring to FIGS. 2A-2C together, the first 2LU samples of the filtered symbols 250A may be removed from the filtered symbols 250A, leaving the example BWSC symbol 130A including one period (having a number $N_{TS}$=NU of samples) of the filtered symbols 250A with a cyclic prefix 249 (having a number $N_{CP}$U) added thereto, where $N_{CP}$ is a number of samples of the original cyclic prefix added by the periodic extension of symbols 232, and U is the upsampling factor. Accordingly, the BWSC symbol 130A includes U(N+$N_{CP}$) samples, and is a data-CP BWSC symbol.

Of course, a cyclic postfix may be used instead of the cyclic prefix 249 without departing from the scope of the disclosure. Also, 2LU samples could be removed from the end of the filtered symbol 250A instead of from the beginning, leaving a whole period of the filtered symbols 250A and a cyclic prefix or postfix (to mitigate ISI). The process used by the BWSC modulator 200 may be known at a far-end receiver so that cyclic offsetting may be used to ultimately reproduce the original block of symbols 238.

The BWSC symbol 130 may be output to a DAC, or some other circuitry (e.g., multiple input multiple output (MIMO) circuitry, etc.), and transmitted to a far-end communication device (e.g., the base station 110 (FIG. 1), the UEs 120 (FIG. 1), etc.).

A length of the filter has no impact on the final efficiency of the BWSC modulator 200. Accordingly, a desired ISI can be obtained by using a large L of the filter while β of the filter is kept small to maintain the overhead of the bandwidth expansion as small as possible. As compared to a null-CP BWSC modulation scheme, the proposed data-CP BWSC modulation scheme would be about 18% more efficient for similar ISI, in some scenarios. In general, some advantages of data-CP BWSC modulation over null-CP modulation are summarized as follows:

Higher system efficiency in terms of data symbols/sec/Hz

Lower spectrum side lobes due to larger pulse shaping length and less impact of pulse shaping truncation effect Better long-term PAPR due to consistent and stationary variation of signal power by avoiding on-off behavior as in null-CP scheme Lower dynamic range of power variation over time as a preference for RF chains More accurate time synchronization due to consistent average power of the signal FFT is performed on data symbols only, rather than data symbols plus nulls as in null-CP BWSC.

FIGS. 3A-3D illustrate functions of one example of a BWSC demodulator 300 (FIG. 3A) for using circular convolution and data-based cyclic prefix/postfix ("data-CP BWSC").

Figure 3A:
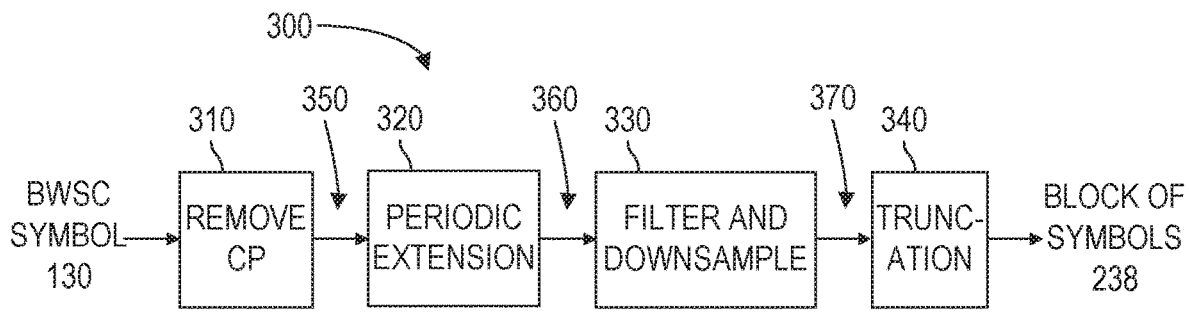
FIG. 3A is a signal flow diagram of a BWSC demodulator, according to some embodiments.

FIG. 3A is a signal flow diagram of a BWSC demodulator 300, according to some embodiments. The BWSC demodulator 300 is configured to reconstruct a block of detected symbols 238 from a BWSC symbol 130 received from a far-end communication device. For example, the far-end communication device may have generated the BWSC symbol 130 from a block of symbols 238 using the BWSC modulator 200 of FIG. 2A. Accordingly, viewed in one way, the BWSC demodulator 300 essentially reverses the operations of the BWSC modulator 200. The process is relatively similar to OFDMA demodulation.

Figure 3B:
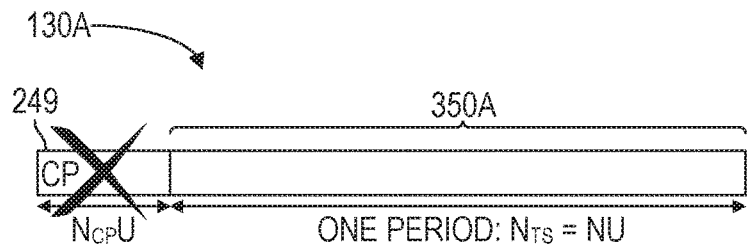
FIG. 3B illustrates removal of a cyclic prefix from an example BWSC symbol to produce an example period of the BWSC symbol.

The BWSC demodulator 300 includes removing 310 a cyclic prefix/postfix from the BWSC symbol 130 to produce one period 350 (having $N_{TS}$=NU samples) of the BWSC symbol 130. FIG. 3B illustrates removal of a cyclic prefix 249 from an example BWSC symbol 130A to produce an example period 350A of the BWSC symbol 130A. In some embodiments, however, a cyclic postfix may instead be removed from the BWSC symbol 130 to produce the period 350 of the BWSC symbol 130 (FIG. 3A).

Returning to FIG. 3A, the BWSC demodulator 300 also includes a periodic extender 320 configured to periodically extend the period 350 of the BWSC symbol 130 to form an extended symbol 360. The extended symbol 360 may enable circular convolution of the period 350, and mitigate the impact of tails of a match filter. Similarly to the periodic extension of symbols 232 of FIG. 2A, the periodic extender 320 may be configured to extend the period 350 with a periodic prefix, a periodic postfix, or a combination thereof.

Figure 3C:
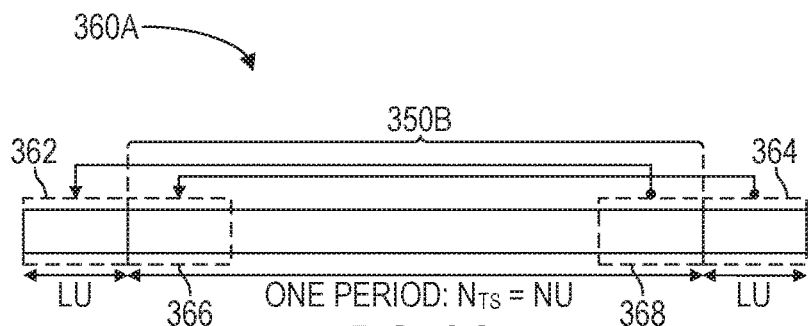
FIG. 3C illustrates periodic extension of an example period to produce an example extended symbol.

FIG. 3C illustrates periodic extension of an example period 350B to produce an example extended symbol 360A. A last LU samples 368 of the example period 350B are added as a periodic prefix 362 to the example period 350B. Also, a first LU samples 366 of the example period 350B are added as a periodic postfix 364 to the example period 350B. With the periodic prefix 362 and the periodic postfix 364 added to the example period 350A, the example extended symbol 360A is formed.

Returning to FIG. 3A, the BWSC demodulator 300 includes filtering and downsampling 330 the extended symbol 360 to produce an extended block of symbols 370 (sometimes referred to herein as "extended symbols" 370). Filtering and downsampling 330 includes filtering the extended symbol 360 with a match filter. As used herein, the term "match filter" refers to a filter of the BWSC demodulator 300 that matches a filter of the BWSC modulator 200 such that a transfer function of the match filter is:

$$h_{match}(t) = h^*(-t),$$

where h(t) is a transfer function of the filter of the BWSC modulator 200, and * indicates a complex conjugate.

In some embodiments, the match filter may be applied in a frequency domain over the upsampled signal. By way of non-limiting example, filtering can happen in the frequency domain as follows:

Remove prefix/postfix, the remaining is UN samples (upsampled signal)

Apply FFT to go to frequency domain. NU tone is calculated

Apply match filter in frequency domain (frequency response of match filter is multiplied by frequency domain signal over each tone)

Signal is downsampled in frequency domain (i.e. frequency shifting and adding; N tones after down sampling Signal may be equalized to compensate channel response Equalized signal gets back to time domain (e.g., using an inverse fast Fourier transform (IFFT))

Circular time shift might be applied to compensate for circular delay (circular shift can be applied before, or be equalized as well).

In summary, the match filter can be applied in the frequency domain after CP removal and FFT conversion of the upsampled signal.

Filtering and downsampling 330, in some embodiments, also includes downsampling the extended symbol 360 (e.g., after filtering the extended symbol 360 with the match filter). If downsampling by the same factor (e.g., U) as the upsampling of block 234 of FIG. 2A is employed, 2L+N samples forming the extended block of symbols 370 will result. The last N samples of the extended symbols 370 represent the original block of symbols 238 used by the far-end communication device to generate the BWSC symbol 130. The downsampling, however, may be somewhat arbitrary, and might be skipped to enable baseband processing over the upsampled signal for equalization, timing alignment, etc.

Figure 3D:
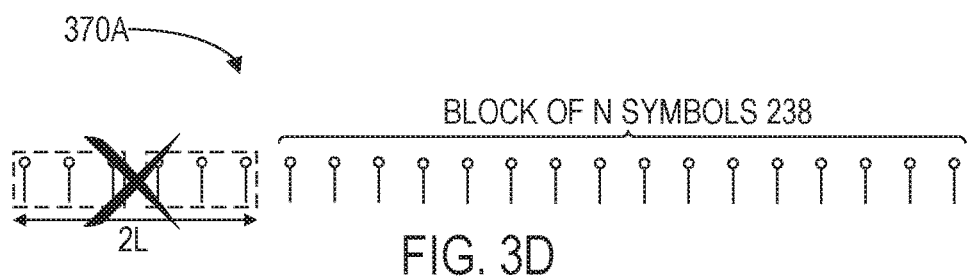
FIG. 3D illustrates truncating of example extended symbols to obtain an example block of symbols.

The BWSC demodulator 300 also includes truncating 340 the extended block of symbols 370 to obtain the block of symbols 238. FIG. 3D illustrates truncating of example extended symbols 370A to obtain an example block of N symbols 238A. In the example of FIG. 3D, the first 2L samples of the example extended symbols 370A are removed to obtain the block of N symbols 238A. In some embodiments, however, samples may be truncated from the end of the extended symbols 370. In some embodiments, cyclic shifting may be used to obtain the block of symbols 238 after truncating.

Figure 4:
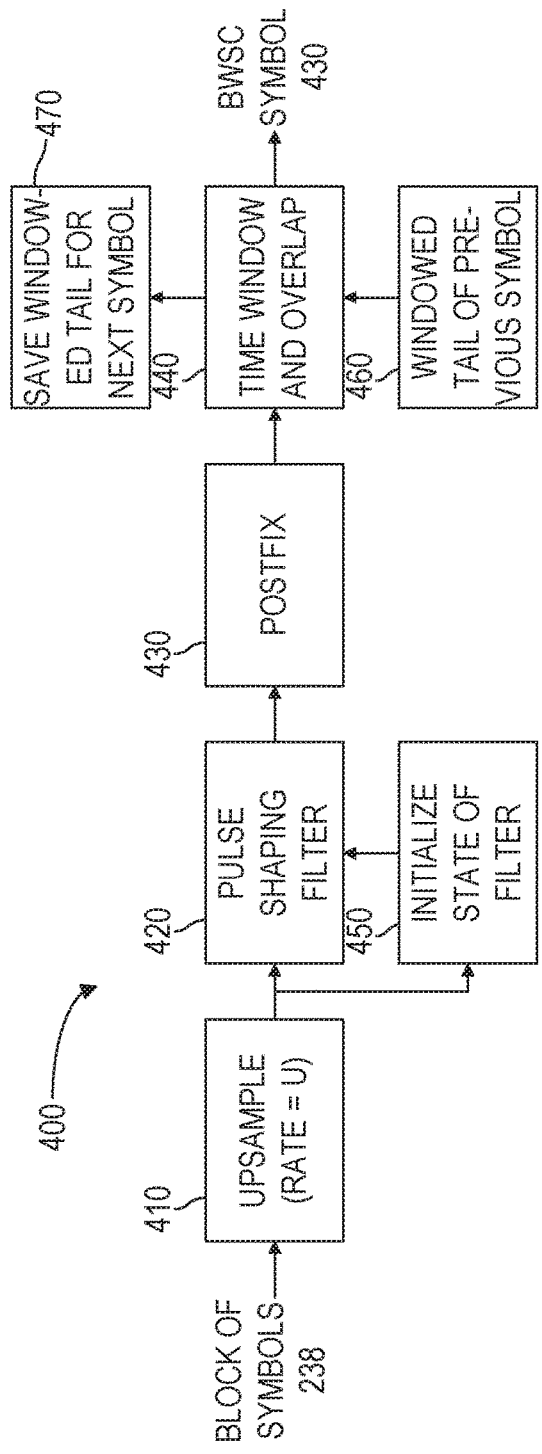
FIG. 4 is a simplified signal flow diagram of another example BWSC modulator, according to some embodiments.

FIG. 4 is a simplified signal flow diagram of another example BWSC modulator 400, according to some embodiments. Instead of periodically extending a block of symbols 238 to perform circular modulation on the block of symbols, as discussed with reference to FIGS. 2A and 2B, circular convolution may be implemented by initializing a state of a filter (e.g., as opposed to using a zero state of the filter as in the BWSC modulator 200 and the BWSC demodulator 300). The BWSC modulator 400 illustrates an example of this approach.

The BWSC modulator 400 includes upsampling 410 (e.g., by inserting zeros) the block of symbols 238 (e.g., QAM symbols) to generate upsampled symbols. The upsampled symbols may be represented as $x_n$, where $0 \le n \le NU-1$, where n is a reference number of a sample of the upsampled symbols, N is a number of symbols in the block of symbols 238, and U is the upsampling factor of the upsampling 410.

The BWSC modulator 400 also includes a pulse shaping filter 420 (with an initial state) and initialization 450 of a state of the filter 420. By way of non-limiting example, the pulse shaping filter 420 may include a finite impulse response (FIR) pulse shaping filter. The impulse response of the filter is $h=[h_0, h_1, \ldots, h_{M-1}]$ where M is the length of the filter. An initial state of filter may be $s_0=[x_{NU-1} \ldots x_{NU-M+1}]$. An output of the pulse shaping filter 420 may be given by $y_n=[x_n \ s_n]h$ (where $0 \le n \le NU-1$). The initialization 450 of a state may be configured to update a state of the pulse shaping filter 420, according to $s_{n+1}=[x_n \ s_{n,0} \ s_{n,1} \ldots s_{n,M-3}]$, for $0 \le n \le NU-1$. Note that $s_{n,k}$ represents the kth element of vector $s_n$.

The filtered symbols generated at an output of the pulse shaping filter 420 are postfixed 480 with a cyclic postfix to mitigate the effects of delay spread of a fading channel. It should be noted, however, that instead of a cyclic postfix, a cyclic prefix may be prefixed to the filtered symbols, or a combination of a cyclic prefix and a cyclic postfix may be used. In the example of FIG. 4, the postfix is used because it may be more convenient for pipeline implementation. A resulting output of the postfix 480 may be:

$$z=[y_0 \ldots y_{UN_W-1}|y_{UN_W} \ldots y_{NU-1}|y_0 \ldots y_{UN_{CP}-1}|y_{UN_{CP}} \ldots y_{UN_{CP}+UN_W-1}],$$

where $y_0 \ldots y_{UN_{CP}-1}$ corresponds to a cyclic postfix, and $y_{UN_{CP}} \ldots y_{UN_{CP}+UN_W-1}$ corresponds to a windowing tail. It should be noted that a time advance of duration $N_{CP}T_s$ is implied, which is compensated for at a far-end receiver using circular time shift.

Windowing and overlap between consecutive BWSC symbols 430 may be used to prevent large transients between consecutive BWSC symbols 430. Accordingly, the BWSC modulator 400 may include time window and overlap 440, windowed tail of previous symbol 460, and save windowed tail for next symbol 470. More detail regarding windowing will be discussed below with reference to FIG. 6. Also, although not discussed above with reference to FIG. 2A, the BWSC modulator 200 may include, in some instances, time window and overlap 440, windowed tail of previous symbol 460, and save windowed tail for next symbol 470 to enable windowing.

The output of the BWSC modulator 400 includes a BWSC symbol 430, which may be transmitted to a far-end communication device (e.g., one of the base station 110 or the UEs 120 of FIG. 1).

Figure 5:
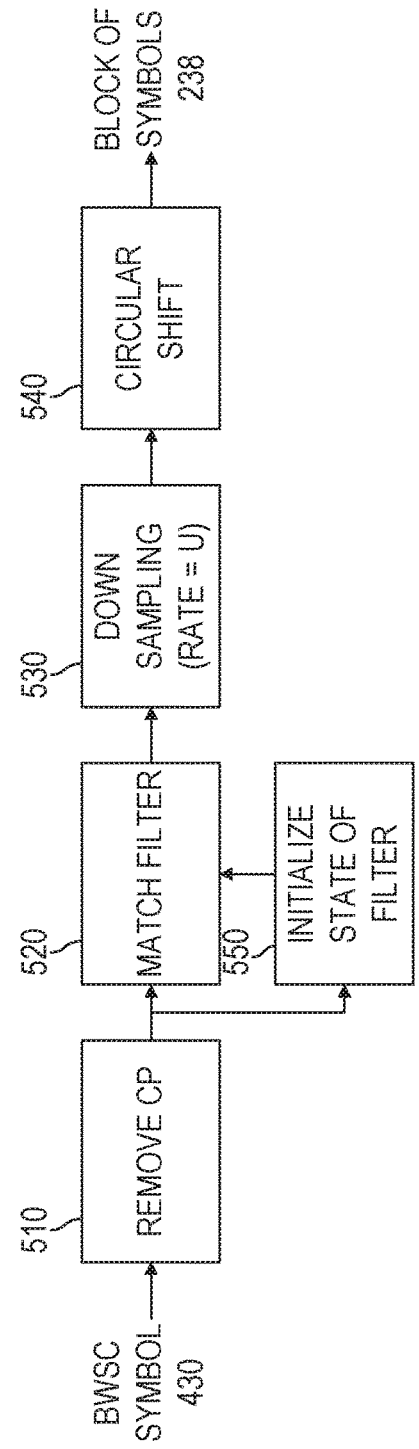
FIG. 5 is a simplified signal flow diagram of another example of a BWSC demodulator, according to some embodiments.

FIG. 5 is a simplified signal flow diagram of another example of a BWSC demodulator 500, according to some embodiments. The BWSC demodulator 500 is a state-based implementation of data-CP BWSC demodulator, and is configured to reconstruct a block of detected symbols 238 from a BWSC symbol 430 received from a far-end communication device. For example, the far-end communication device may have generated the BWSC symbol 430 from a block of symbols 238 using the BWSC modulator 400 of FIG. 4. Accordingly, viewed in one way, the BWSC demodulator 500 essentially reverses the operations of the BWSC modulator 400.

Once the BWSC symbol 430 arrives, it goes through a procedure as shown in FIG. 5. For example, the BWSC demodulator 500 includes remove CP 510, a match filter 520 and accompanying initialize state of filter 550, downsampling 530, and circular shift 540 to produce the original block of symbols 238 used by the BWSC modulator 400 (FIG. 4) to produce the BWSC symbol 430.

Even though, as discussed above with reference to FIG. 4, a cyclic postfix may have been added by the postfix 480 of the BWSC modulator 400, the remove CP 510 may remove samples from the beginning of the BWSC symbol 430 (e.g., treating it as a cyclic prefix), as in conventional OFDMA systems. This imposes an $N_{CP}$ time offset in the system (which is compensated after equalization using the circular shift 540). It should be understood, however, that the remove CP 510 may instead remove samples from the end of the BWSC symbol 430 (e.g., treating it as a cyclic postfix) without departing from the scope of the disclosure.

The match filter 520 matches the pulse shaping filter 420 of FIG. 4. As with the pulse shaping filter 420, the match filter enables the BWSC demodulator 500 to perform circular convolution. The filtered symbols at the output of the match filter 520 are downsampled 530 (e.g., at a rate U). In some embodiments, the match filter 520 may be applied in a frequency domain over the upsampled symbol. Also, a frequency domain version of the filtered BWSC symbols may be equalized one of before or after downsampling 530.

The downsampled symbols are applied to the circular shift 540 to cyclically shift the downsampled symbols to generate the block of symbols 238. As previously discussed, a time advance or delay may be introduced due to mismatch of cyclic prefixes and cyclic postfixes applied by the BWSC modulator 400 and removed by the BWSC demodulator 500. The circular shift 540 is configured to compensate for this advance or delay. Also, the circular shift 540 is configured to compensate for a delay of samples (e.g., 2L+1 samples of delay) caused by the pulse shaping filter 420 (FIG. 4) and the match filter 520. The resulting block of symbols 238 is the same as the original block of symbols 238 modulated by the BWSC modulator 400.

Figure 6:
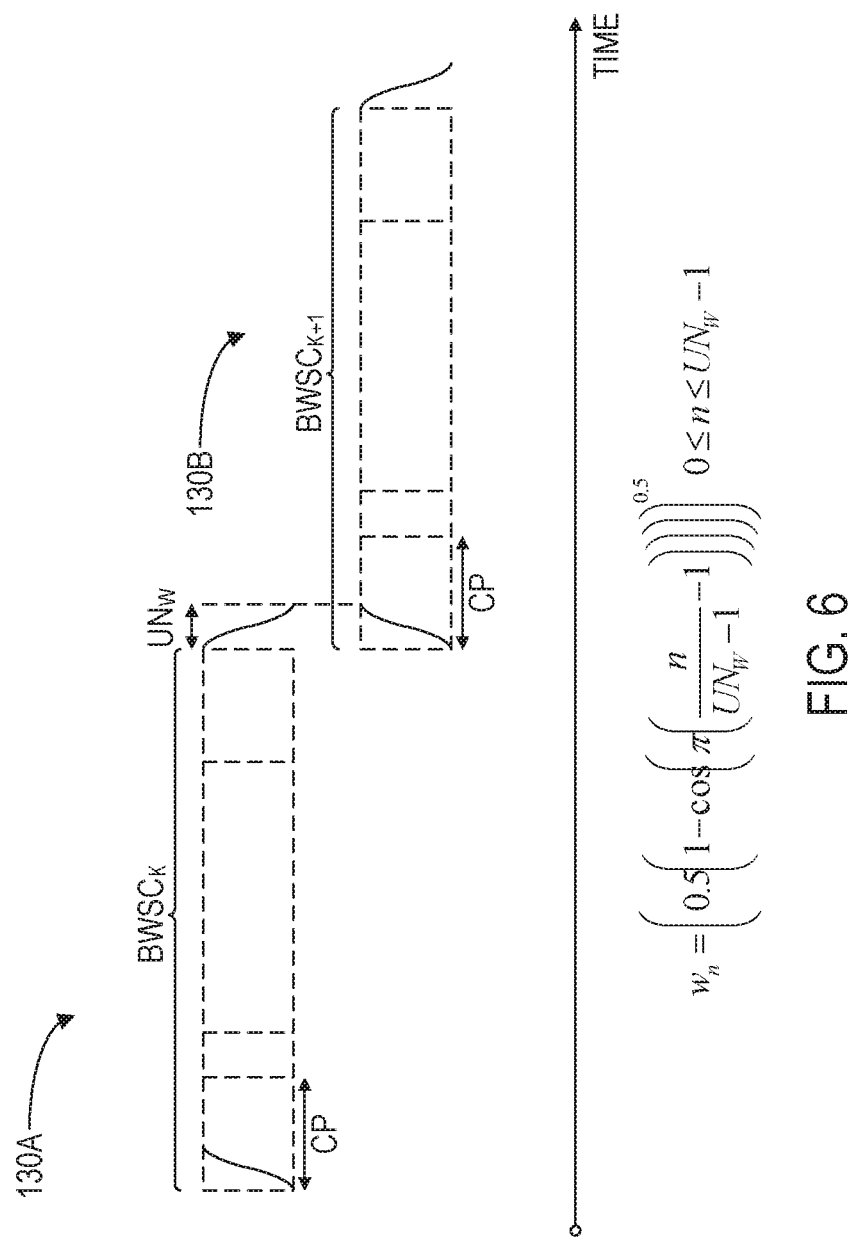
FIG. 6 is a plot illustrating windowing and overlap of BWSC symbols, according to some embodiments.

FIG. 6 is a plot 600 illustrating windowing and overlap of BWSC symbols 130A, 130B, according to some embodiments. The plot 600 includes plots representing two different BWSC symbols 130A, 130B (sometimes referred to individually as "BWSC$_K$" 130A and "BWSC$_{K+1}$" 130B). As illustrated in FIG. 6, each of the BWSC symbols 130A, 130B includes a cyclic prefix (CP). In some embodiments, the BWSC symbols 130A, 130B include a cyclic prefix, a cyclic postfix, or a combination thereof.

The BWSC$_K$ and BWSC$_{K+1}$ are overlapped (e.g., an overlap of UN$_W$ samples) in time to smooth a transition between BWSC$_K$ and BWSC$_{K+1}$ according to a windowing function. For example, the windowing function may be given by:

$$w_n = \left(0.5\left(1 - \cos\left(\pi\left(\frac{n}{UN_W - 1} - 1\right)\right)\right)\right)^{0.5}, \text{ where } 0 \le n \le UN_W - 1.$$

As will be observed from the plot 600, an effective length of the cyclic prefix of BWSC$_{K+1}$ is reduced due to the overlap of the BWSC symbols 130A, 130B. Accordingly, if windowing is used, longer cyclic prefixes or cyclic postfixes may be used to accommodate for the windowing overlap.

Figure 7:
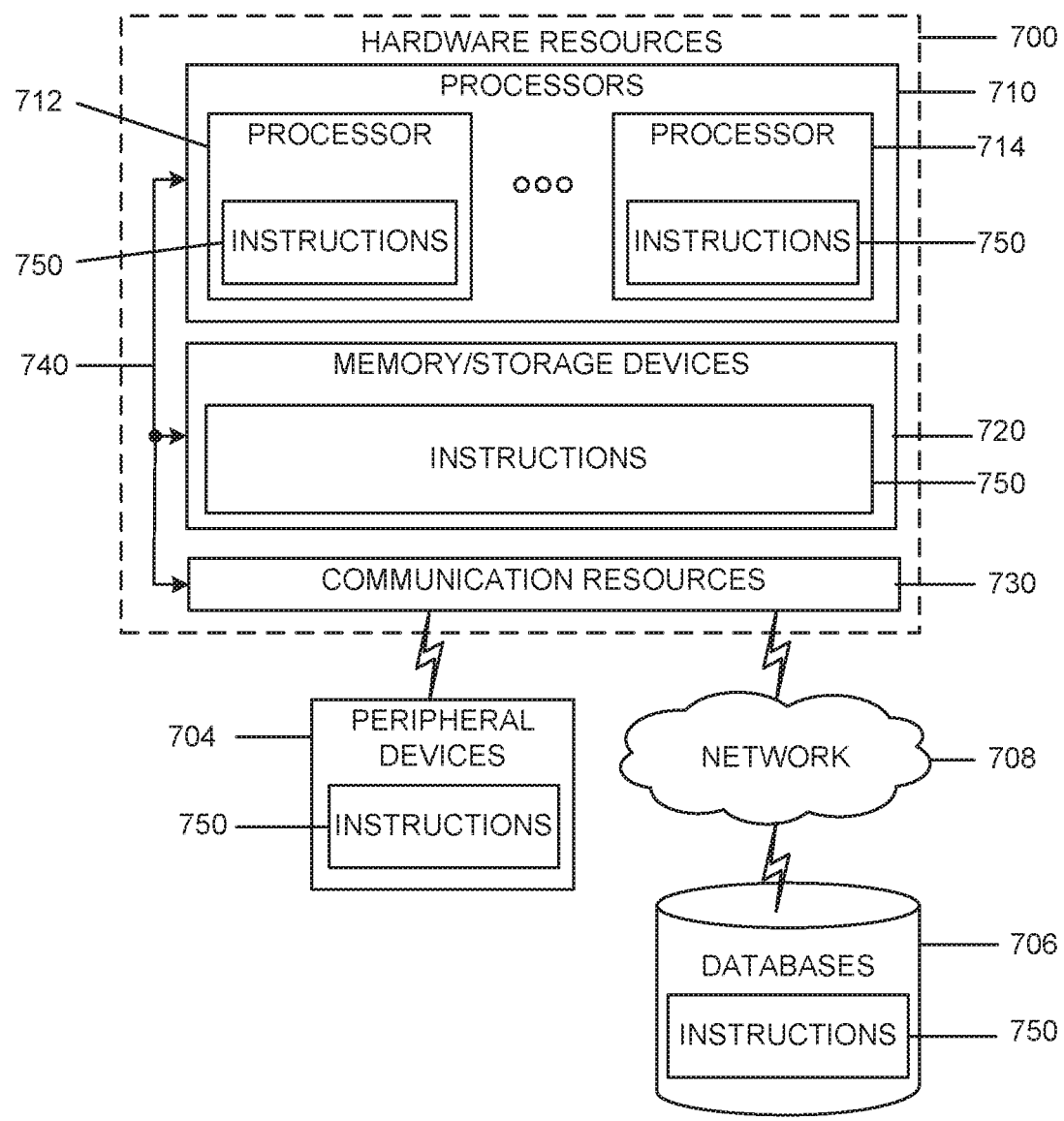
FIG. 7 is a block diagram illustrating components, according to some example embodiments.

FIG. 7 is a block diagram illustrating components, according to some example embodiments, able to read instructions from a machine-readable or computer-readable medium (e.g., a machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which is communicatively coupled via a bus 740.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714. The memory/storage devices 720 may include main memory, disk storage, or any suitable combination thereof.

The communication resources 730 may include interconnection and/or network interface components or other suitable devices to communicate with one or more peripheral devices 704 and/or one or more databases 706 via a network 708. For example, the communication resources 730 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 and/or the databases 706. Accordingly, the memory of processors 710, the memory/storage devices 720, the peripheral devices 704, and the databases 706 are examples of computer-readable and machine-readable media.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
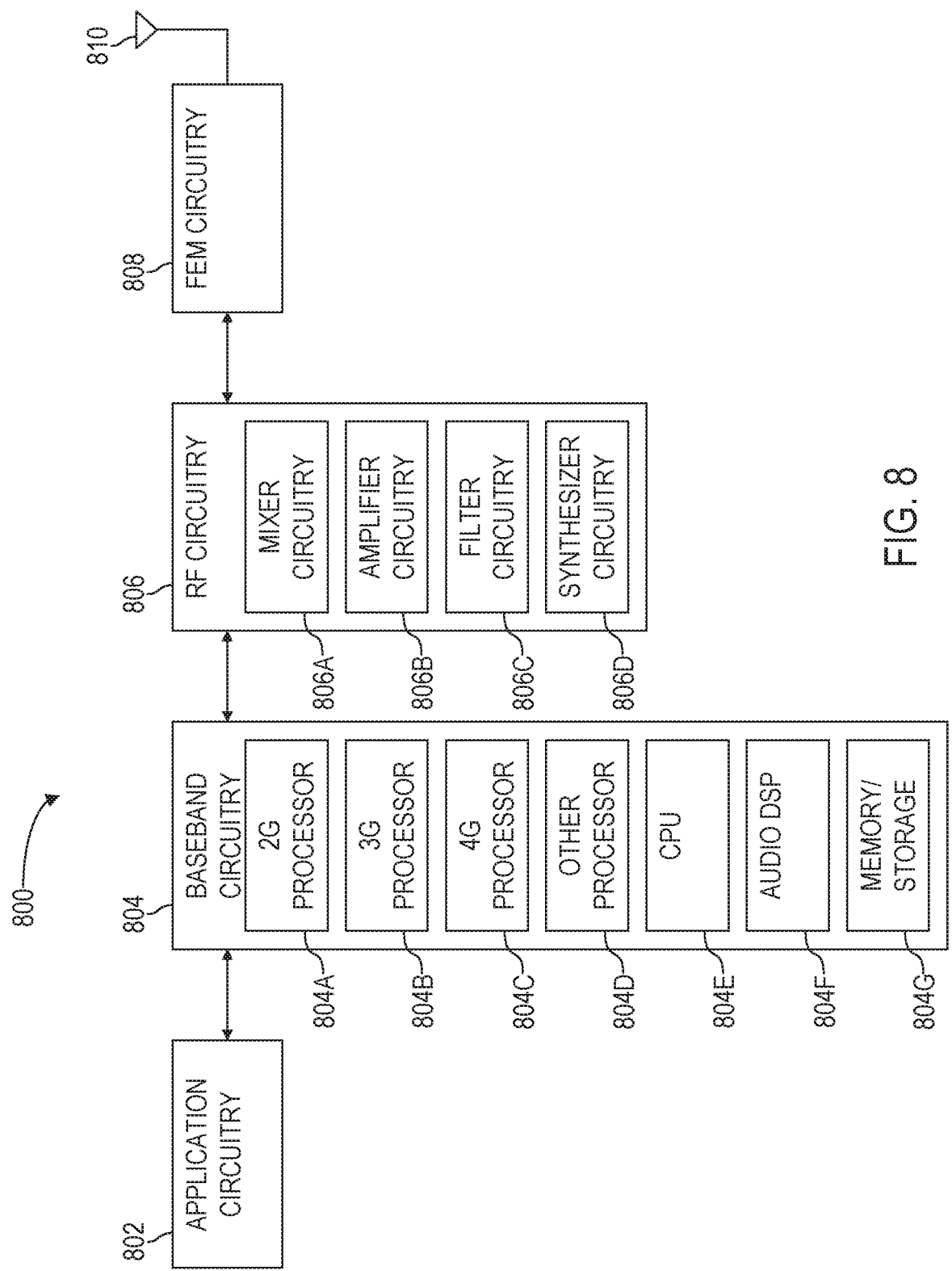
FIG. 8 illustrates, for some embodiments, example components of an electronic device.

Embodiments described herein may be implemented into a system using any suitably configured hardware and/or software. FIG. 8 illustrates, for some embodiments, example components of an electronic device 800. In some embodiments, the electronic device 800 may be, may implement, may be incorporated into, or otherwise may be a part of a user equipment (UE) (e.g., the UEs 120 of FIG. 1), a cellular base station (e.g., the base station 110 of FIG. 2), or some other suitable electronic device. In some embodiments, the electronic device 800 may include application circuitry 802, baseband circuitry 804, Radio Frequency (RF) circuitry 806, front-end module (FEM) circuitry 808 and one or more antennas 810, coupled together at least as shown in FIG. 8.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804A, third generation (3G) baseband processor 804B, fourth generation (4G) baseband processor 804C, and/or other baseband processor(s) 804D for other existing generations, generations in development, or generations to be developed in the future (e.g., fifth generation (5G), 6G, etc.). The baseband circuitry 804 (e.g., one or more of baseband processors 804A-D) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804E of the baseband circuitry 804 may be configured to run elements of the protocol stack for signaling of the PHY, MAC, RLC, PDCP and/or RRC layers. In some embodiments, the baseband circuitry 804 may include one or more audio digital signal processor(s) (DSP) 804F. The audio DSP(s) 804F may include elements for compression/decompression and echo cancellation and may include other suitable processing elements in other embodiments.

The baseband circuitry 804 may further include memory/storage 804G. The memory/storage 804G may be used to load and store data and/or instructions for operations performed by the processors of the baseband circuitry 804. Memory/storage 804G for one embodiment may include any combination of suitable volatile memory and/or non-volatile memory. The memory/storage 804G may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 804G may be shared among the various processors or dedicated to particular processors.

Components of the baseband circuitry 804 may be suitably combined in a single chip, combined in a single chipset, or disposed on a same circuit board in some embodiments. In some embodiments, some or all of the constituent components of the baseband circuitry 804 and the application circuitry 802 may be implemented together, such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc., to facilitate the communication with the wireless network. RF circuitry 806 may include a receive signal path, which may include circuitry to down-convert RF signals received from the FEM circuitry 808 and provide baseband signals to the baseband circuitry 804. RF circuitry 806 may also include a transmit signal path, which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806A, amplifier circuitry 806B, and filter circuitry 806C. The transmit signal path of the RF circuitry 806 may include filter circuitry 806C and mixer circuitry 806A. RF circuitry 806 may also include synthesizer circuitry 806D for synthesizing a frequency for use by the mixer circuitry 806A of the receive signal path and the transmit signal path. In some embodiments, the mixer circuitry 806A of the receive signal path may be configured to down-convert RF signals received from the FEM circuitry 808 based on the synthesized frequency provided by synthesizer circuitry 806D. The amplifier circuitry 806B may be configured to amplify the down-converted signals, and the filter circuitry 806C may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806A of the receive signal path may comprise passive mixers, although the scope of the embodiments is not limited in this respect.

In some embodiments, the mixer circuitry 806A of the transmit signal path may be configured to up-convert input baseband signals based on the synthesized frequency provided by the synthesizer circuitry 806D to generate RF output signals for the FEM circuitry 808. The baseband signals may be provided by the baseband circuitry 804 and may be filtered by filter circuitry 806C. The filter circuitry 806C may include a low-pass filter (LPF), although the scope of the embodiments is not limited in this respect.

In some embodiments, the mixer circuitry 806A of the receive signal path and the mixer circuitry 806A of the transmit signal path may include two or more mixers and may be arranged for quadrature downconversion and/or upconversion respectively. In some embodiments, the mixer circuitry 806A of the receive signal path and the mixer circuitry 806A of the transmit signal path may include two or more mixers and may be arranged for image rejection (e.g., Hartley image rejection). In some embodiments, the mixer circuitry 806A of the receive signal path and the mixer circuitry 806A of the transmit signal path may be arranged for direct downconversion and/or direct upconversion, respectively. In some embodiments, the mixer circuitry 806A of the receive signal path and the mixer circuitry 806A of the transmit signal path may be configured for superheterodyne operation.

In some embodiments, the output baseband signals and the input baseband signals may be analog baseband signals, although the scope of the embodiments is not limited in this respect. In some embodiments, the output baseband signals and the input baseband signals may be digital baseband signals. In these embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806D may be a fractional-M synthesizer or a fractional M/M+1 synthesizer, although the scope of the embodiments is not limited in this respect as other types of frequency synthesizers may be suitable. For example, synthesizer circuitry 806D may be a delta-sigma synthesizer, a frequency multiplier, or a synthesizer comprising a phase-locked loop with a frequency divider.

The synthesizer circuitry 806D may be configured to synthesize an output frequency for use by the mixer circuitry 806A of the RF circuitry 806 based on a frequency input and a divider control input. In some embodiments, the synthesizer circuitry 806D may be a fractional M/M+1 synthesizer.

In some embodiments, frequency input may be provided by a voltage controlled oscillator (VCO), although that is not a requirement. Divider control input may be provided by either the baseband circuitry 804 or the application circuitry 802 depending on the desired output frequency. In some embodiments, a divider control input (e.g., M) may be determined from a look-up table based on a channel indicated by the application circuitry 802.

Synthesizer circuitry 806D of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either M or M+1 (e.g., based on a carry-out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, the RF circuitry 806 may include an IQ/polar converter.

FEM circuitry 808 may include a receive signal path, which may include circuitry configured to operate on RF signals received from one or more antennas 810, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the electronic device 800 may include additional elements such as, for example, memory/storage, display, camera, sensor, and/or input/output (I/O) interface.

In embodiments where the electronic device 800 is, implements, is incorporated into, or is otherwise part of a base station or a UE, the RF circuitry 806 may be to receive and to send a signal. The baseband circuitry 804 may be to implement the BWSC modulator 200 (FIG. 2A), 400 (FIG. 4), the BWSC demodulator 300 (FIG. 3A), 500 (FIG. 5), some other embodiment or example disclosed herein, or combinations thereof.

In some embodiments, the electronic device 800 of FIG. 8 may be configured to perform one or more processes, techniques, and/or methods as described herein, or portions thereof. For example, the electronic device 800 of FIG. 8 may be configured to implement the BWSC modulator 200 (FIG. 2A), 400 (FIG. 4), the BWSC demodulator 300 (FIG. 3A), 500 (FIG. 5), some other embodiment or example disclosed herein, or combinations thereof.

EXAMPLES

The following is a list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1

An apparatus for a communication device, including: control circuitry configured to: use circular convolution for pulse shape filtering of a block of data symbols of a single carrier waveform to generate a block-wise single carrier (BWSC) symbol; and insert one of a data-based cyclic prefix or a data-based cyclic postfix into the BWSC symbol one of before the pulse shape filtering or after the pulse shape filtering.

Example 2

The apparatus of Example 1, wherein the apparatus includes an apparatus for a user equipment.

Example 3

The apparatus of Example 1, wherein the apparatus includes any apparatus for a cellular base station.

Example 4

The apparatus according to any one of Examples 1-3, wherein the block of data symbols includes a block of quadrature amplitude modulated (QAM) symbols.

Example 5

The apparatus according to any one of Examples 1-4, wherein the control circuitry is configured to window and overlap the BWSC symbol with one or more other BWSC symbols to smooth a transition between the BWSC symbol and the one or more other BWSC symbols.

Example 6

The apparatus according to any one of Examples 1-5, wherein the control circuitry is configured to use the circular convolution for pulse shape filtering of the block of data symbols by: extend the block of data symbols to generate a block of periodically extended symbols; upsample the block of periodically extended symbols to generate a block of upsampled symbols; filter the block of upsampled symbols to produce a block of filtered symbols; and truncate the block of filtered symbols to generate the BWSC symbol.

Example 7

The apparatus of Example 6, wherein the control circuitry is configured to extend the block of data symbols by adding a prefix periodic extension, a postfix periodic extension, or a combination thereof to the block of data symbols.

Example 8

The apparatus of Example 7, wherein the control circuitry is configured to include the one of the data-based cyclic prefix or the data-based cyclic postfix in one of the prefix periodic extension or the postfix periodic extension, respectively.

Example 9

The apparatus according to any one of Examples 6-8, wherein the control circuitry is configured to filter the block of upsampled symbols with a root raised cosine (RRC) filter to produce the block of filtered symbols.

Example 10

The apparatus according to any one of Examples 1-5, wherein the control circuitry is configured to use the circular convolution for pulse shape filtering of the block of data symbols by filtering the block of data symbols with a pulse shape filter initialized to an initial state to generate a filtered block of data symbols.

Example 11

The apparatus of Example 10, wherein the control circuitry is configured to upsample the block of data symbols before filtering the block of data symbols with the pulse shape filter.

Example 12

The apparatus according to any one of Examples 10 and 11, wherein the control circuitry is configured to add at least one of a cyclic postfix or a cyclic prefix to the filtered block of data symbols to generate the BWSC symbol.

Example 13

An apparatus for a communication device, including: one or more processors; one or more computer-readable storage media operably coupled to the one or more processors and including computer-readable instructions stored thereon, the computer-readable instructions configured to instruct the one or more processors to: remove one or more of a cyclic prefix or a cyclic postfix from a received block wise single carrier (BWSC) symbol; add a periodic extension including a prefix periodic extension, a postfix periodic extension, or a combination thereof to the BWSC symbol to generate an extended BWSC symbol; filter the extended BWSC symbol to produce a filtered BWSC symbol; downsample the filtered BWSC symbol to obtain a block of periodically extended symbols; and remove redundancies from the block of periodically extended symbols to obtain a block of data symbols.

Example 14

The apparatus of Example 13, wherein the control circuitry is configured to add both the prefix periodic extension and the postfix periodic extension to the received BWSC symbol to generate the extended BWSC symbol.

Example 15

The apparatus according to any one of Examples 13 and 14, wherein the control circuitry is configured to filter the extended BWSC symbol with a match filter to produce the filtered BWSC symbol, wherein the match filter matches a filter used by a far-end communication device to generate the received BWSC symbol.

Example 16

The apparatus according to any one of Examples 13-15, wherein the apparatus includes an apparatus for a user equipment.

Example 17

The apparatus according to any one of Examples 13-15, wherein the apparatus includes an apparatus for a cellular base station.

Example 18

An apparatus for a communication device, including: control circuitry configured to: remove at least one of a cyclic prefix or a cyclic postfix from a received block wise single carrier (BWSC) symbol; and filter the received BWSC symbol with a match filter initialized to an initial state to circularly convolve the BWSC symbol to generate a filtered BWSC symbol, the match filter matching a filter used by a far end communication device to generate the received BWSC symbol.

Example 19

The apparatus according to any one of Examples 13-18, wherein the control circuitry is further configured to equalize a frequency domain version of the filtered BWSC symbol to generate a block of data symbols.

Example 20

The apparatus of Example 19, wherein the control circuitry is configured to equalize the frequency domain version of the filtered BWSC symbol with a frequency domain multiple input multiple output (MIMO) equalizer.

Example 21

The apparatus according to any one of Examples 19 and 20, wherein the control circuitry is configured to downsample the filtered BWSC symbol before equalizing the frequency domain version of the filtered BWSC symbol.

Example 22

The apparatus according to any one of Examples 13-21, wherein the control circuitry is configured to circularly shift the block of data symbols to generate an original block of data symbols generated by the far-end communication device.

Example 23

The apparatus according to any one of Examples 13-22, wherein the control circuitry is configured to remove the cyclic prefix from the received BWSC symbol regardless of whether the far-end communication device added the cyclic prefix, the cyclic postfix, or a combination thereof when generating a BWSC symbol corresponding to the received BWSC symbol.

Example 24

The apparatus according to any one of Examples 18-23, wherein the apparatus includes an apparatus for a user equipment.

Example 25

The apparatus according to any one of Examples 18-23, wherein the apparatus includes an apparatus for a base station.

Example 26

A method of operating a communication device, the method including: using circular convolution for pulse shape filtering of a block of data symbols of a single carrier waveform to generate a block-wise single carrier (BWSC) symbol; and inserting one of a data-based cyclic prefix or a data-based cyclic postfix into the BWSC symbol one of before the pulse shape filtering or after the pulse shape filtering.

Example 27

The method of Example 26, wherein operating a communication device includes operating a user equipment.

Example 28

The method of Example 26, wherein operating a communication device includes operating a cellular base station.

Example 29

The method according to any one of Examples 26-28, wherein using circular convolution for pulse shape filtering of a block of data symbols includes using circular convolution for pulse shape filtering of a block of quadrature amplitude modulated (QAM) symbols.

Example 30

The method according to any one of Examples 26-29, further including windowing and overlapping the BWSC symbol with one or more other BWSC symbols to smooth a transition between the BWSC symbol and the one or more other BWSC symbols.

Example 31

The method according to any one of Examples 26-30, wherein using circular convolution for pulse shape filtering of a block of data symbols includes: extending the block of data symbols to generate a block of periodically extended symbols; upsampling the block of periodically extended symbols to generate a block of upsampled symbols; filtering the block of upsampled symbols to produce a block of filtered symbols; and truncating the block of filtered symbols to generate the BWSC symbol.

Example 32

The method of Example 31, wherein extending the block of data symbols includes adding a prefix periodic extension, a postfix periodic extension, or a combination thereof to the block of data symbols.

Example 33

The method of Example 32, wherein adding a prefix periodic extension, a postfix periodic extension, or a combination thereof includes including the one of the data-based cyclic prefix or the data-based cyclic postfix in one of the prefix period extension or the postfix periodic extension, respectively.

Example 34

The method according to any one of Examples 31-33, wherein filtering the block of upsampled symbols includes filtering the block of upsampled symbols with a root raised cosine (RRC) filter to produce the block of filtered symbols.

Example 35

The method according to any one of Examples 26-30, wherein using circular convolution for pulse shape filtering of a block of data symbols includes filtering the block of data symbols with a pulse shape filter initialized to an initial state to generate a filtered block of data symbols.

Example 36

The method of Example 35, further including upsampling the block of data symbols before filtering the block of data symbols with the pulse shape filter.

Example 37

The method according to any one of Examples 35 and 36, further including adding at least one of a cyclic postfix or a cyclic prefix to the filtered block of data symbols to generate the BWSC symbol.

Example 38

A method of operating a communication device, the method including: removing one or more of a cyclic prefix or a cyclic postfix from a received block wise single carrier (BWSC) symbol; adding a periodic extension including a prefix periodic extension, a postfix periodic extension, or a combination thereof to the BWSC symbol to generate an extended BWSC symbol; filtering the extended BWSC symbol to produce a filtered BWSC symbol; downsampling the filtered BWSC symbol to obtain a block of periodically extended symbols; and removing redundancies from the block of periodically extended symbols to obtain a block of data symbols.

Example 39

The method of Example 38, wherein adding a periodic expansion includes adding both the prefix periodic extension and the postfix periodic extension to the received BWSC symbol to generate the extended BWSC symbol.

Example 40

The method according to any one of Examples 38 and 39, wherein filtering the extended BWSC symbol to produce the filtered BWSC symbol includes filtering the extended BWSC symbol with a match filter to produce the filtered BWSC symbol, wherein the match filter matches a filter used by a far-end communication device to generate the received BWSC symbol.

Example 41

The method according to any one of Examples 38-40, wherein operating a communication device includes operating a user equipment.

Example 42

The method according to any one of Examples 38-41, wherein operating a communication device includes operating a cellular base station.

Example 43

A method of operating a communication device, the method including: removing at least one of a cyclic prefix or a cyclic postfix from a received block-wise single carrier BWSC symbol; and filtering the received BWSC symbol with a match filter initialized to an initial state to circularly convolve the BWSC symbol to generate a filtered BWSC symbol, the match filter matching a filter used by a far-end communication device to generate the received BWSC symbol.

Example 44

The method according to any one of Examples 38-43, further including equalizing a frequency domain version of the filtered BWSC symbol to generate a block of data symbols.

Example 45

The method of Example 44, wherein equalizing a frequency domain version of the filtered BWSC symbol to generate a block of data symbols includes equalizing the frequency domain version of the filtered BWSC symbol with a frequency domain multiple input multiple output (MIMO) equalizer.

Example 46

The method according to any one of Examples 44 and 45, further including downsampling the filtered BWSC symbol before equalizing the frequency domain version of the filtered BWSC symbol.

Example 47

The method according to any one of Examples 38-46, further including circularly shifting the block of data symbols to generate an original block of data symbol generated by the far-end communication device.

Example 48

The method according to any one of Examples 38-47, wherein removing at least one of a cyclic prefix or a cyclic postfix includes removing the cyclic prefix from the received BWSC symbol regardless of whether the far-end communication device added the cyclic prefix, the cyclic postfix, or a combination thereof when generating a BWSC symbol corresponding to the received BWSC symbol.

Example 49

The method according to any one of Examples 43-48, wherein operating the communication device includes operating a user equipment.

Example 50

The method according to any one of Examples 43-48, wherein operating the communication device includes operating a base station.

Example 51

A non-transitory computer-readable storage medium including computer-readable instructions stored thereon, the computer-readable instructions configured to instruct a processor to perform the method according to any one of Examples 26-50.

Example 52

A means for performing the method according to any one of Examples 26-50.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure, as contemplated by the inventors.

The invention claimed is:

1. An apparatus for a communication device, comprising:
control circuitry configured to:
use circular convolution for pulse shape filtering of a block of data symbols of a single carrier waveform to generate a block-wise single carrier (BWSC) symbol, using the circular convolution including filtering the block data symbols with a pulse shape filter initialized to an initial state to generate a filtered block of data symbols;
insert one of a data-based cyclic prefix or a data-based cyclic postfix into the BWSC symbol one of before the pulse shape filtering or after the pulse shape filtering; and
window and overlap the BWSC symbol with one or more other BWSC symbols to smooth a transition between the BWSC symbol and the one or more other BWSC symbols.

2. The apparatus of claim 1, wherein the apparatus comprises an apparatus for a user equipment.

3. The apparatus of claim 1, wherein the apparatus comprises any apparatus for a cellular base station.

4. The apparatus of claim 1, wherein the block of data symbols includes a block of quadrature amplitude modulated (QAM) symbols.

5. The apparatus of claim 1, wherein the control circuitry is configured to use the circular convolution for pulse shape filtering of the block of data symbols by:
extending the block of data symbols to generate a block of periodically extended symbols;
upsampling the block of periodically extended symbols to generate a block of upsampled symbols;
filtering the block of upsampled symbols to produce a block of filtered symbols; and
truncating the block of filtered symbols to generate the BWSC symbol.

6. The apparatus of claim 5, wherein the control circuitry is configured to extend the block of data symbols by adding a prefix periodic extension, a postfix periodic extension, or a combination thereof to the block of data symbols.

7. The apparatus of claim 6, wherein the control circuitry is configured to include the one of the data-based cyclic prefix or the data-based cyclic postfix in one of the prefix periodic extension or the postfix periodic extension, respectively.

8. The apparatus of claim 5, wherein the control circuitry is configured to filter the block of upsampled symbols with a root raised cosine (RRC) filter to produce the block of filtered symbols.

9. The apparatus of claim 1, wherein the control circuitry is configured to upsample the block of data symbols before filtering the block of data symbols with the pulse shape filter.

10. The apparatus of claim 1, wherein the control circuitry is configured to add at least one of a cyclic postfix or a cyclic prefix to the filtered block of data symbols to generate the BWSC symbol.

11. An apparatus for a communication device, comprising:
control circuitry including one or more processors;
one or more non-transitory computer-readable storage media operably coupled to the one or more processors and including computer-readable instructions stored thereon, the computer-readable instructions configured to instruct the one or more processors to:
remove one or more of a cyclic prefix or a cyclic postfix from a received block-wise single carrier (BWSC) symbol;
add a periodic extension comprising a prefix periodic extension, a postfix periodic extension, or a combination thereof to the BWSC symbol to generate an extended BWSC symbol;
filter the extended BWSC symbol to produce a filtered BWSC symbol;
downsample the filtered BWSC symbol to obtain a block of periodically extended symbols; and
remove redundancies from the block of periodically extended symbols to obtain a block of data symbols.

12. The apparatus of claim 11, wherein the control circuitry is configured to add both the prefix periodic extension and the postfix periodic extension to the received BWSC symbol to generate the extended BWSC symbol.

13. The apparatus of claim 11, wherein the control circuitry is configured to filter the extended BWSC symbol with a match filter to produce the filtered BWSC symbol, wherein the match filter matches a filter used by a far-end communication device to generate the received BWSC symbol.

14. The apparatus of claim 11, wherein the apparatus comprises an apparatus for a user equipment.

15. The apparatus of claim 11, wherein the apparatus comprises an apparatus for a cellular base station.

16. An apparatus for a communication device, comprising:
control circuitry configured to:
remove at least one of a cyclic prefix or a cyclic postfix from a received block-wise single carrier (BWSC) symbol; and
filter the received BWSC symbol with a match filter initialized to an initial state to circularly convolve the BWSC symbol to generate a filtered BWSC symbol, the match filter matching a filter used by a far-end communication device to generate the received BWSC symbol.

17. The apparatus of claim 11, wherein the control circuitry is further configured to equalize a frequency domain version of the filtered BWSC symbol to generate a block of data symbols.

18. The apparatus of claim 17, wherein the control circuitry is configured to equalize the frequency domain version of the filtered BWSC symbol with a frequency domain multiple input multiple output (MIMO) equalizer.

19. The apparatus of claim 17, wherein the control circuitry is configured to downsample the filtered BWSC symbol before equalizing the frequency domain version of the filtered BWSC symbol.

20. The apparatus of claim 16, wherein the control circuitry is configured to circularly shift the block of data symbols to generate an original block of data symbols generated by the far-end communication device.

21. The apparatus of claim 16, wherein the control circuitry is configured to remove the cyclic prefix from the received BWSC symbol regardless of whether the far-end communication device added the cyclic prefix, the cyclic postfix, or a combination thereof when generating a BWSC symbol corresponding to the received BWSC symbol.

22. The apparatus of claim 16, wherein the apparatus comprises an apparatus for a user equipment.

23. The apparatus of claim 16, wherein the apparatus comprises an apparatus for a base station.

\* \* \* \* \*